United States Patent [19]
Shaffer

[11] Patent Number: 5,881,675
[45] Date of Patent: Mar. 16, 1999

[54] BIRD FEEDER OR BIRD HOUSE ASSEMBLY

[76] Inventor: Gordon Shaffer, Rte. 3 Box 2909, Canyon, Tex. 79015

[21] Appl. No.: 916,250

[22] Filed: Aug. 22, 1997

Related U.S. Application Data

[60] Provisional application No. 60/030,740 Nov. 12, 1996.
[51] Int. Cl.⁶ .......................... A01K 31/00; A01K 39/01
[52] U.S. Cl. ........................ 119/430; 119/435; 119/52.2
[58] Field of Search .................... 119/52.2, 52.3, 119/430, 435, 429

[56] References Cited

U.S. PATENT DOCUMENTS

| | | |
|---|---|---|
| D. 120,738 | 5/1940 | Larsen . |
| 137,980 | 4/1873 | Vanstone ................................. 119/429 |
| 388,385 | 8/1888 | Wooster . |
| 2,077,208 | 4/1937 | Brady ...................................... 119/430 |
| 2,786,446 | 3/1957 | Newman ................................. 119/52.2 |
| 3,087,460 | 4/1963 | Stone . |
| 3,108,570 | 10/1963 | Kerkhove . |
| 3,115,865 | 12/1963 | Parkes et al. ........................ 119/430 X |
| 3,198,172 | 8/1965 | Crane, Jr. ................................. 119/430 |
| 3,205,858 | 9/1965 | Chadek .................................... 119/430 |
| 3,244,148 | 4/1966 | Long ........................................ 119/430 |
| 3,441,002 | 4/1969 | Lawalin et al. . |
| 4,242,983 | 1/1981 | Moore . |
| 5,269,242 | 12/1993 | Toldi ...................................... 119/52.2 |
| 5,372,094 | 12/1994 | Zens ........................................ 119/522 |

FOREIGN PATENT DOCUMENTS

| | | | |
|---|---|---|---|
| 949406 | 6/1974 | Canada ................................... 119/435 |

*Primary Examiner*—Robert P. Swiatek
*Attorney, Agent, or Firm*—Richard C. Litman

[57] ABSTRACT

A bird house or feeder assembly, used to construct a bird house or feeder from a container such as, but not limited to, a plastic milk jug or two liter soda bottle. In one embodiment, the assembly includes a roof structure, a perch and entrance ring assembly, and a bracket assembly. The roof structure is made up of a skirt piece and a crown piece which attach to the container when constructing either a bird house or feeder, by placing the skirt piece around the container spout, screwing the container cap onto the spout to clamp the skirt piece in place, and then attaching the crown piece to the top of the skirt piece. The perch and entrance ring are then attached to the container to make a bird house. In a second embodiment, the assembly includes a roof structure, a feeder pan, and two bracket assemblies. The roof structure is attached to the container in the same fashion as the first embodiment, but then the feeder pan is attached to the container to make a bird feeder. In both embodiments, the bracket assemblies allow the bird house or feeder to be hung easily from a vertical surface.

16 Claims, 5 Drawing Sheets

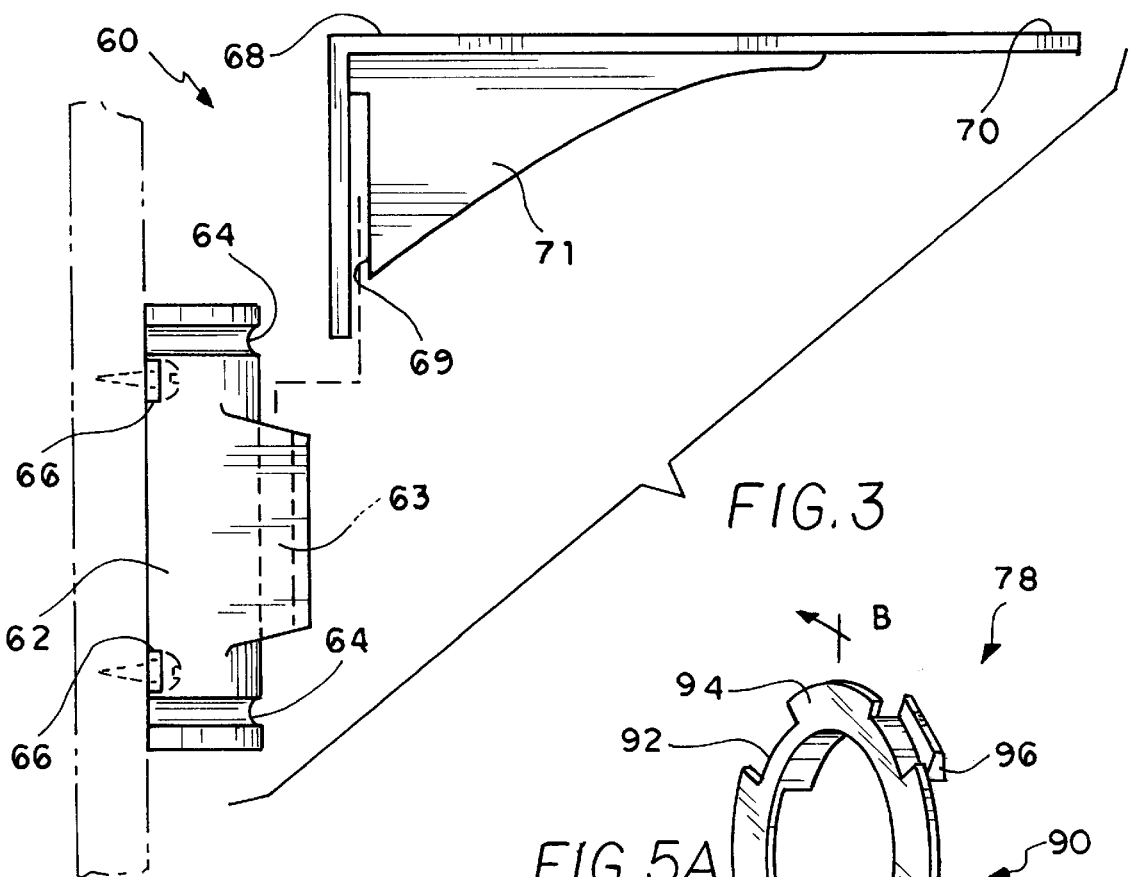
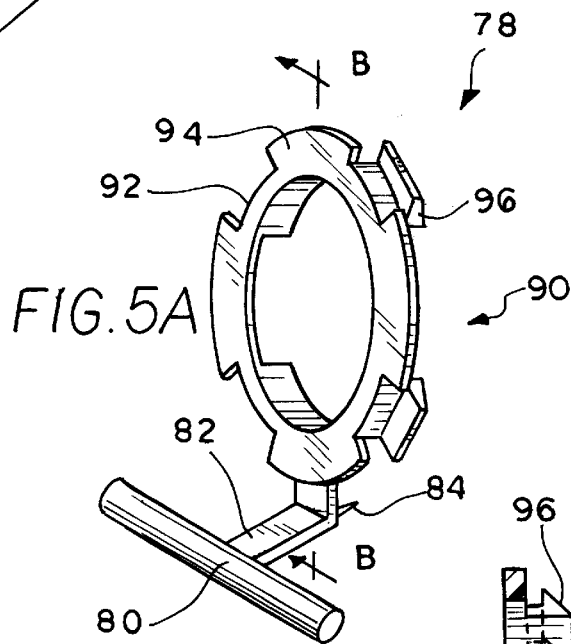
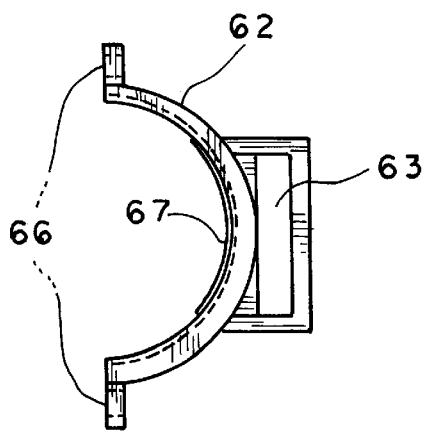
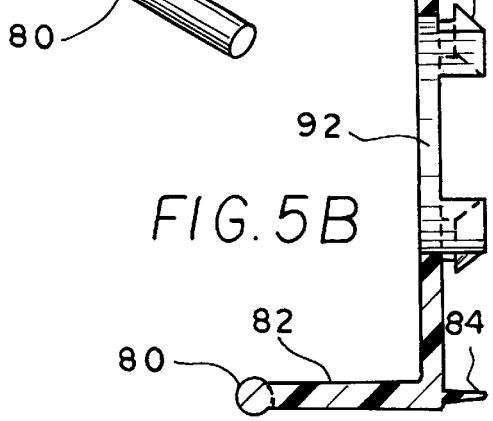

BIRD FEEDER OR BIRD HOUSE ASSEMBLY

CROSS-REFERENCE TO RELATED APPLICATION

This application claims the benefit of U.S. Provisional Patent Application Ser. No. 60/030,740, filed Nov. 12, 1996.

BACKGROUND OF THE INVENTION

1. Field of the Invention

The present invention relates to bird houses and feeders. More specifically, the invention relates to an assembly which may be used to convert a plastic milk jug, a two liter soda bottle, or a similar container into a bird house, feeder, or bath.

2. Description of the Related Art

Great interest exists in the preservation of bird life and in the feeding and housing of birds near homes, where they can conveniently be observed. Many bird houses and feeders and kits for constructing them have been disclosed in the prior art. These include kits for converting previously used containers into bird houses and or feeders and easily constructed bird house and or feeder assemblies. However, none of the prior art discloses a kit for converting a plastic milk jug or a similar container into a bird house, feeder, or bath that includes easily attachable mounting brackets and a roof structure which is placed around the container spout and secured thereto by screwing the container cap onto the spout over the roof structure.

U.S. Pat. No. 3,108,570, issued Feb. 19, 1963 to Maurice Kerkhove, shows a colony bird house which is constructed by clamping empty coffee cans between a roof structure and floor board members. The bird house of Kerkhove does not utilize a plastic milk jug or a similar container, the roof structure attachment means, or the easily attachable mounting brackets of the present invention.

U.S. Pat. Nos. 3,198,172 (Crane, Jr.) and 5,372,094 (Zens) show respectively a bird house and a bird feeder constructed from an empty milk container. However, the bird house and bird feeder described in these patents are constructed from paperboard milk containers rather than a plastic milk jug or a similar container like the present invention and they lack the easily attachable mounting brackets of the present invention.

U.S. Pat. Nos. 3,205,858 (Chadek), 3,244,148 (Long), and 4,242,983 (Moore) show bird houses made from empty containers. None of these mentioned patents show a bird house utilizing an attachable roof structure or mounting bracket.

U.S. Pat. Nos. 3,115,865 (Parkes et al.) and 3,441,002 (Lawalin et al.) show bird feeders constructed from bird seed containers. The bird feeders described in these patents lack the easily attachable mounting bracket and the attachable roof structure of the present invention.

U.S. Design Pat. No. 120,738, issued Jun. 29, 1939 to Andrew C. Larsen, discloses a bird house with a novel decorative appearance. The appearance of the Larsen bird house is quite different from the appearance of the bird house of the present invention.

U.S. Pat. No. 388,385 issued Aug. 21, 1888 to Charles I. Wooster, shows a bird house with variably sized circles scored into a wall of the bird house which allow an appropriately sized door to be cut therein.

U.S. Pat. No. 3,087,460 and Canadian document number 949,406 (France) show bird house assemblies which allow the interior of the bird house to be easily accessed. Neither of these mentioned bird house assemblies utilize a plastic milk jug or an easily attachable roof structure.

None of the above inventions and patents, taken either singularly or in combination, is seen to describe the instant invention as claimed. Thus a bird house or feeder assembly solving the aforementioned problems is desired.

SUMMARY OF THE INVENTION

The present invention is an assembly for converting a plastic milk jug or a similar container into a bird house or bird feeder. In all embodiments of the present invention, the assembly includes an easily attachable roof structure and a bracket assembly. In a first embodiment, the assembly also includes a perch and entrance ring assembly so that a bird house may be constructed. In a second embodiment, the assembly also includes a feeder pan and a second bracket assembly so that a bird feeder may be constructed.

When the assembly is used to make a bird house, a hole is cut in one side of the container, the perch and entrance ring assembly is placed therein, and then the roof structure is secured to the top of the container to complete the bird house. When the assembly is used to make a bird feeder, holes are cut in the sides of the container adjacent the bottom of the container, the feeder pan is attached to the bottom of the container, and then the roof structure is secured to the top of the container.

The roof structure is made up of a skirt piece which attaches to the top of the container and a crown piece which attaches to the top of the skirt piece so that the roof structure approximates a cone shape. The skirt piece is secured to the top of the container by inserting the container's spout through a hole formed in the top of the skirt piece and then screwing the cap onto the container over the skirt piece thereby clamping the skirt piece in place against the base of the spout.

The bracket assemblies, which are each made up of a bracket arm and easily mounted bracket base, are included to make hanging the bird house or feeder easy to accomplish, even without the use of tools. A single bracket assembly is all that is necessary to support a bird house constructed using the assembly of the present invention, while both brackets may be used to support the extra weight of the bird seed contained in a bird feeder constructed using the assembly according to the second embodiment of the present invention.

Accordingly, it is a principal object of the invention to provide an assembly which may be used to convert a container such as a plastic milk jug into a bird house or feeder.

It is another object of the invention to provide a bird house or feeder assembly that includes a roof structure which may be easily attached to the top of a container without using tools.

It is a further object of the invention to provide a bird house or feeder assembly that includes a roof bracket assembly and a feeder bracket assembly so that a bird house or feeder constructed using the assembly may be easily mounted and dismounted from a vertical surface.

Still another object of the invention is to provide a bird house or feeder assembly which consists of comparatively few parts and which may be quickly and easily assembled.

It is an object of the invention to provide improved elements and arrangements thereof in a bird house or feeder assembly for the purposes described which is inexpensive, dependable and fully effective in accomplishing its intended purposes.

BRIEF DESCRIPTION OF THE DRAWINGS

FIG. 3 is an exploded side view of the support bracket and bracket base of the bird house and bird feeder assembly.

FIG. 4 is a top view of the bracket base of the bird house and bird feeder assembly.

FIG. 5A is a perspective view of the perch and entrance ring assembly of the bird house assembly.

FIG. 5B is a cross sectional view taken along lines B—B of FIG. 5A.

Similar reference characters denote corresponding features consistently throughout the attached drawings.

DETAILED DESCRIPTION OF THE PREFERRED EMBODIMENTS

Figure 1:
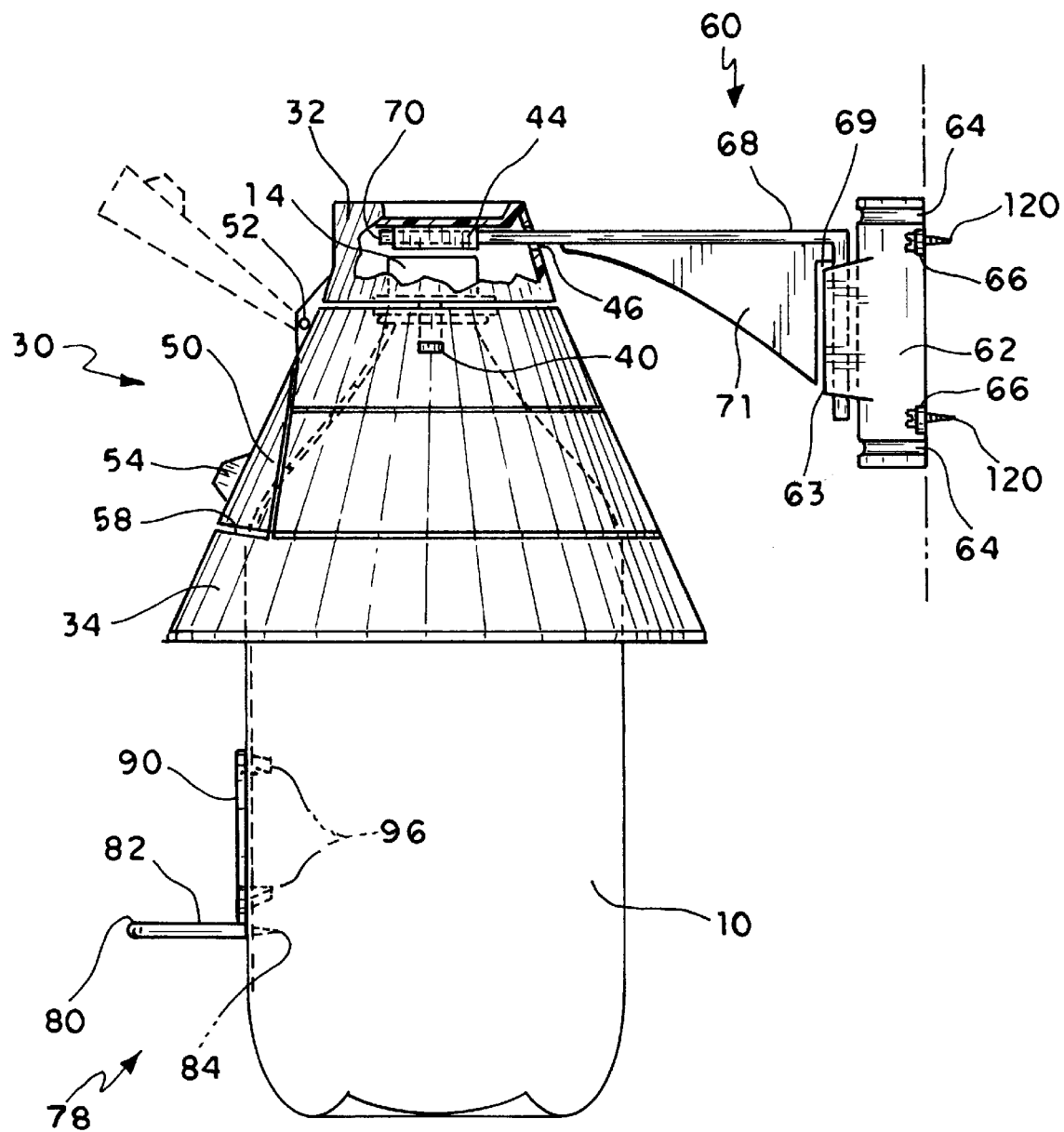
FIG. 1 is an environmental perspective view of a bird house constructed from a two liter soda bottle and the bird house and bird feeder assembly of the present invention.

Referring to the drawings, FIG. 1 illustrates a bird house constructed using a container 10 such as a plastic milk jug and an assembly of the first embodiment of the present invention. In the first embodiment, the assembly includes a roof structure 30, a roof bracket assembly 60, and a perch and entrance ring assembly 78 so that a bird house may be constructed.

Figure 2:
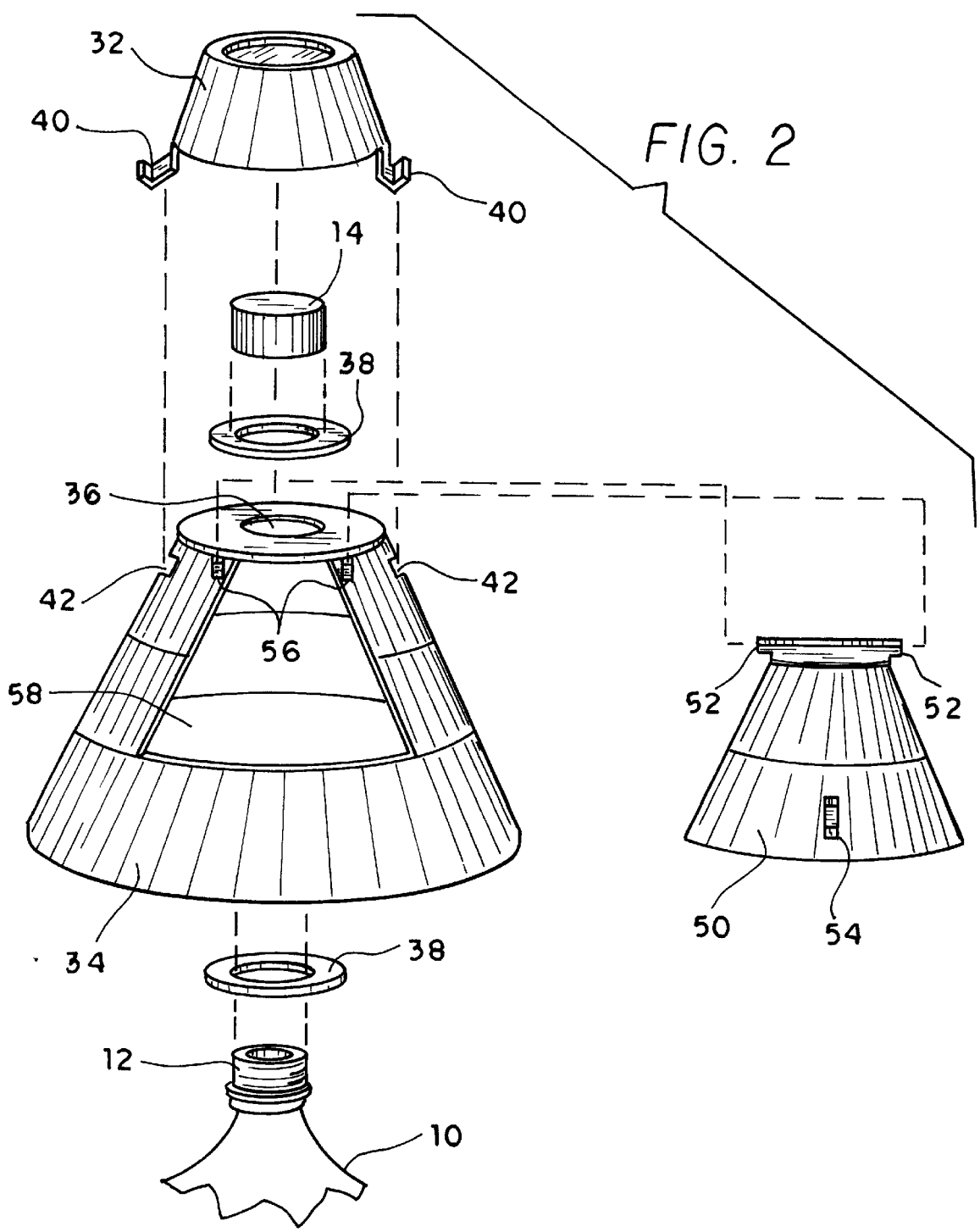
FIG. 2 is an exploded side view of the roof structure of the bird house and bird feeder assembly.

The roof structure 30 is made up of a skirt piece 34 and a crown piece 32 which may be removably attached thereto as best shown in FIG. 2. The skirt piece 34 forms an upwardly tapering frustoconical shell which is open at its bottom and closed at its top. The top of the skirt piece 34 has a spout hole 36 formed through its radial center with a diameter slightly greater than the diameter of the spout 12 on a container 10 having a large spout 12, such as wide mouth fruit drink containers, and smaller than the outer diameter of the container's cap 14.

The spout hole 36 allows the skirt piece 34 to be placed on the top of a container 10 so that the skirt piece extends downwardly and outwardly around the top of the container 10 and the spout 12 protrudes through the spout hole 36. After the skirt piece 34 has been placed on the top of the container 10 in this fashion, it may be secured in place by screwing the cap 14 of the container 10 onto the spout 12 thereby clamping the skirt piece 34 against the base of the spout 12.

The assembly also includes one large washer (not shown) and two small washers 38, all having an outer diameter greater than the diameter of the spout hole 36. The large washer has an inner diameter large enough to encircle the spout 12 of a container 10 with a medium size spout 12, such as a plastic milk jug, and small enough to bear against the cap 14 of the container 10. By placing the large washer around the spout 12 between the cap 14 and the skirt piece 34, the skirt piece 34 will be clamped between the neck of the container 10 and the large washer when the cap 14 is screwed down tightly on the spout 12.

The small washers 38 have inner diameters large enough to encircle the spout 12 of a container 10 with a small spout 12, such as a two liter soda bottle, and small enough to bear against the cap 14 of the container 10. By placing a first small washer 38 around the spout 12 of the container 10 below the skirt piece 34 so that it rests on the neck of the container 10 and then placing the second small washer 38 around the container 10 between the skirt piece 34 and the cap 14, the skirt piece 34 will be clamped against the neck of the container 10, between the small washers 38, when the cap 14 is screwed down tightly on the spout 12. This is illustrated in FIG. 2.

In order to allow the container 10 to be accessed through the roof structure 30, an access door 50 is placed in the sidewall of the skirt piece 34 adjacent the top edge thereof. A pair of hinge pins 52 extend from the sides of the access door 50 adjacent the top thereof and a pair of U-shaped hinge pin receivers 56 are formed in the skirt piece 34 on opposite sides of the door opening 58 adjacent the top thereof so that the access door 50 may be freely pivoted around the hinge pins 52 when the hinge pins 52 are placed within the hinge pin receivers 56. A handle 54 is provided on the outer surface of the access door 50 to make it easy for a person to pivot the access door 50 upward into the open position illustrated in dashed lines in FIG. 1.

The crown piece 32 also forms an upwardly tapering frustoconical shell which is open at its bottom and closed at its top. The top portion of the sidewall of the crown piece 32 has a bracket arm receiving slot 46 formed therethrough which is aligned with a bracket tip receiving slot 44 formed on the interior surface of the crown piece 32 below the top thereof. The diameter of the crown piece 32 at its bottom is approximately equal to the diameter or the skirt piece 34 at its top so that the bottom of crown piece 32 will form a continuous frustoconical surface when placed on top of skirt piece 34.

The crown piece 32 attaches to skirt piece 34 by means of two flexible tabs 40 which extend downwardly from the bottom of the crown piece 32 on opposite sides thereof and two tab receivers 42 formed in the skirt piece 34 adjacent the top thereof and on opposite sides thereof. The tabs 40 are adapted to be flexed inwardly when the crown piece 32 is being lowered onto the skirt piece 34 prior to snapping out into the tab receivers 42 when the crown piece 32 is in placed on top of the skirt piece 34.

The bracket assembly 60 is included to provide structure to detachably support the roof structure from a vertical surface. The roof bracket assembly 60 includes a bracket base 62 and a bracket arm 68 adapted to be placed in a bracket arm receiving slot 63 formed in the front of the bracket base 62. This is shown in FIG. 3.

The bracket base 62 is formed from a flexible material into a generally semicylindrical shell to allow the bracket base 62 to be mounted on cylindrical pole as is illustrated in FIG. 4. The flexibility of the bracket base 62 allows it to bend to accommodate poles having different diameters.

The bracket base 62 has at least two screw holes 66 formed on its longitudinal edges which allow the bracket base 62 to be secured to an vertical surface using screws 120 (shown in FIG. 1), and at least two grooves 64 running horizontally across its front surface so that tie wraps 122 (shown in FIG. 6) can be used to secure the bracket base 62 to a post by securing the tie wrap 122 tightly around the post so that it runs through the grooves 64 in the bracket base 62. In an alternative embodiment, the grooves may be replaced by small loops on the front surface of the bracket base 62 through which the tie wrap 122 would pass. Additionally, the rear surface 67 of the bracket base 62 has an engraved diamond pattern formed thereon to increase the frictional force between the bracket base 62 and the surface on which it is mounted. This is also illustrated in FIG. 4.

In order to allow the bracket arm 68 to be mounted on the bracket base, the bracket arm receiving slot 63 is formed on the front surface of the bracket base 62. The bracket arm receiving slot 63 defines a flat rectangular space with open top and bottom ends which define a vertically disposed longitudinal axis therebetween.

The bracket arm 68 forms an L-shaped member which is adapted to be supported on the bracket base 62 by inserting the short portion of the bracket arm 68 down through the bracket arm receiving slot 63 so that the long portion of the bracket arm 68 extends horizontally and outwardly from the bracket base 62. A generally triangular stabilizing support member 71 joins the underside of the long portion of the bracket arm 68 with the adjacent side of the short portion of the bracket arm 68 to increase the rigidity of the bracket arm 68. In order to allow the short portion of the bracket arm 68 to be inserted through the bracket arm receiving slot 63, a bracket base receiving notch 69 is formed in the stabilizing support 71 adjacent the short portion of the bracket arm 68. This is illustrated in FIG. 3.

In order to mount a bird house constructed using the assembly of the first embodiment of the present invention on a pole or vertical surface, the distal end of the long portion of the bracket arm 68 may be inserted through the bracket arm receiving slot 46 formed in the sidewall of the crown piece 32 and into the bracket tip receiving slot 44 aligned therewith, as is shown in FIG. 1. The distal end of the bracket arm 68 has a pair of notches formed on the sides thereof which define a bracket tip 70 that is adapted to engage the sidewalls of the bracket tip receiving slot 44 to secure the distal end of the bracket arm 68 within the crown piece 32.

Additionally, the crown piece 32 may have a small hole (not shown) formed in the top thereof which may be use to hang a bird house constructed with the assembly of the present invention by threading a string through the hole and tying a knot in the string within the crown piece 32. In order to prevent a bird house hung in this fashion from being spun excessively in windy conditions, the skirt piece 34 has a plurality of stabilizing holes (not shown) formed integrally through its outer surface. A string may be tied to one of the stabilizing holes and tied to a support to the side of the roof structure 30 such as a tree branch so that the string is under tension. This prevents the bird house from twisting as it would if hung using only the small hole in the top of the crown piece 32.

In order to complete a bird house constructed using the assembly of the first embodiment of the present invention, a perch and entrance ring assembly 78 is also included. The perch and entrance ring assembly 78 is comprised of a perch member 80 and a circular entrance ring 90 which are joined integrally by an L shaped connection member 82.

The entrance ring 90 is made up of a ring portion 92, a plurality of face portions 94, and a plurality of notched tabs 96. The ring portion 92 forms a cylindrical shell having an axial length slightly greater than the thickness of the container 10. The face portions 94 are integrally formed on the front edge of the ring portion 92 extending radially therefrom at regular intervals around the circumference thereof. The notched tabs 96 are flexible and they extend axially from the rear edge of the ring portion 92 at regular intervals around the circumference thereof between the face portions 94 formed thereon. This is illustrated in FIGS. 5A and 5B.

By using a template having a diameter equal to outer diameter of the ring portion 94 to cut an entrance hole (not shown) in the side of the container 10, the rear edge of the entrance ring 90 may be pushed into the container causing the notched tabs 96 to bend inward toward the radial center of the ring portion 92 until the face portions 94 meet the front edge of the entrance hole. When the entrance ring is inserted into the entrance hole to this degree the notched tabs 96 return to their original position so that the edge of the entrance hole is sandwiched between the face portions 94 and the notched tabs 96 and the entrance ring 90 is held securely in place. This is illustrated in FIG. 1.

The connection member 82 extends downward from the bottom of the ring member 92 and then horizontally outward to the perch 80. The perch 80 is a cylindrical rod which is bisected by the distal end of the connection member 82 joining it with the entrance ring 90. A pin 84 adapted to pierce the wall of a container 10 extends rearwardly from the vertical portion of the connection member 82 to help secure the connection member 82 and the perch 80 in place below the entrance ring 90.

Figure 6:
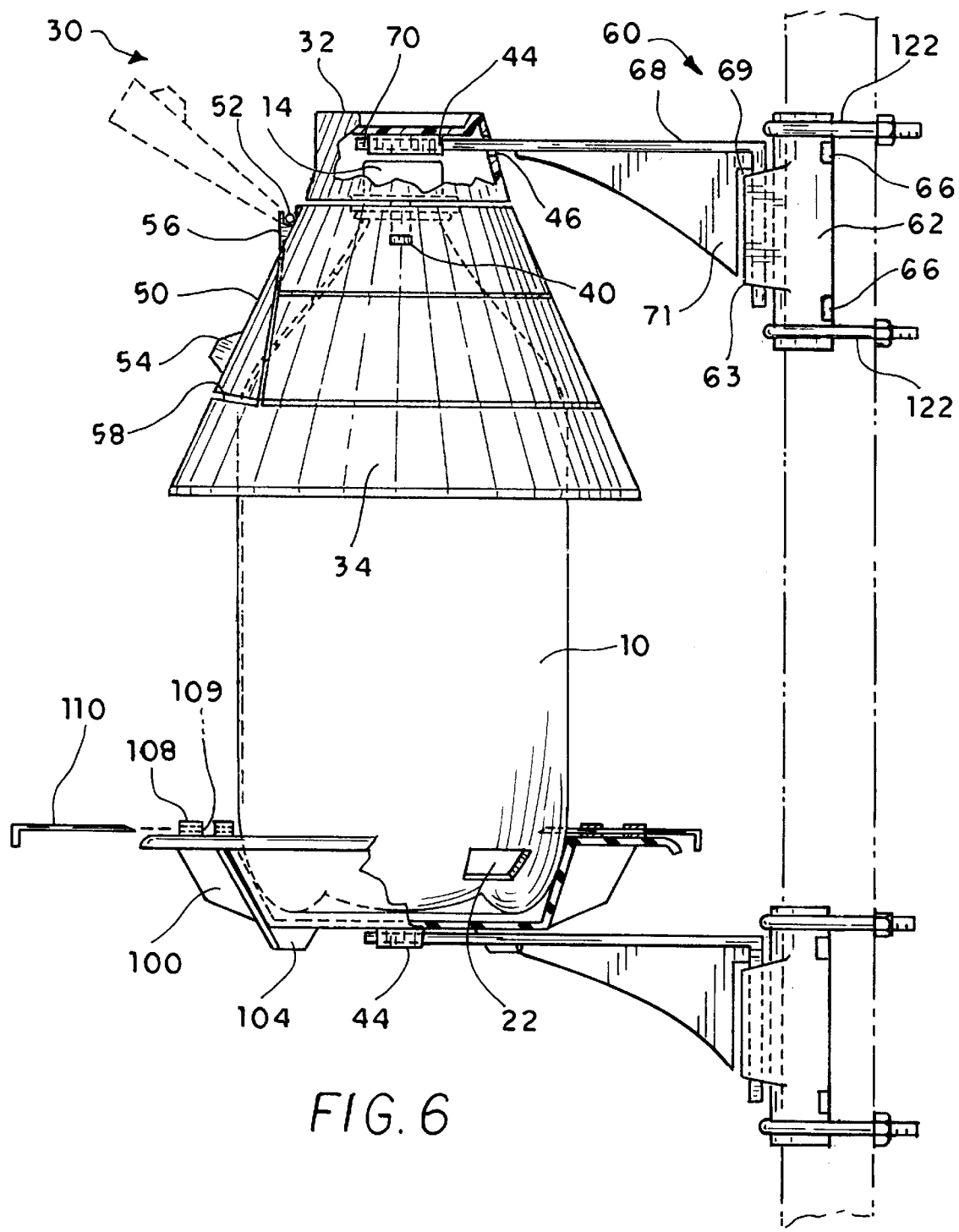
FIG. 6 is a side view of the bird feeder constructed from a milk jug and the feeder assembly.

In a second embodiment of the present invention shown in FIG. 6, the assembly includes the roof structure 30 of the first embodiment, and a feeder pan 100 adapted to be attached to the bottom of a container 10 instead of the perch 80 and entrance ring 90 so that a bird feeder may be constructed. The feeder pan 100 forms a circular bowl having a flat bottom and sufficient depth to contain significant quantities of bird feed therein. The diameter of the feeder pan 100 at its top is large enough to receive the bottom of the container 10 and to catch the bird feed which will spill out of the feed holes 22 which must be cut in the side of the container 10 adjacent its bottom. The bottom of the feeder pan 100 has a plurality of drain holes (not shown) adjacent the radial center thereof so that any water collected in the feeder pan 100 will drain therethrough and the outer circumference of the top edge of the feeder pan 100 is adapted to allow birds to easily stand thereon.

Figure 7:
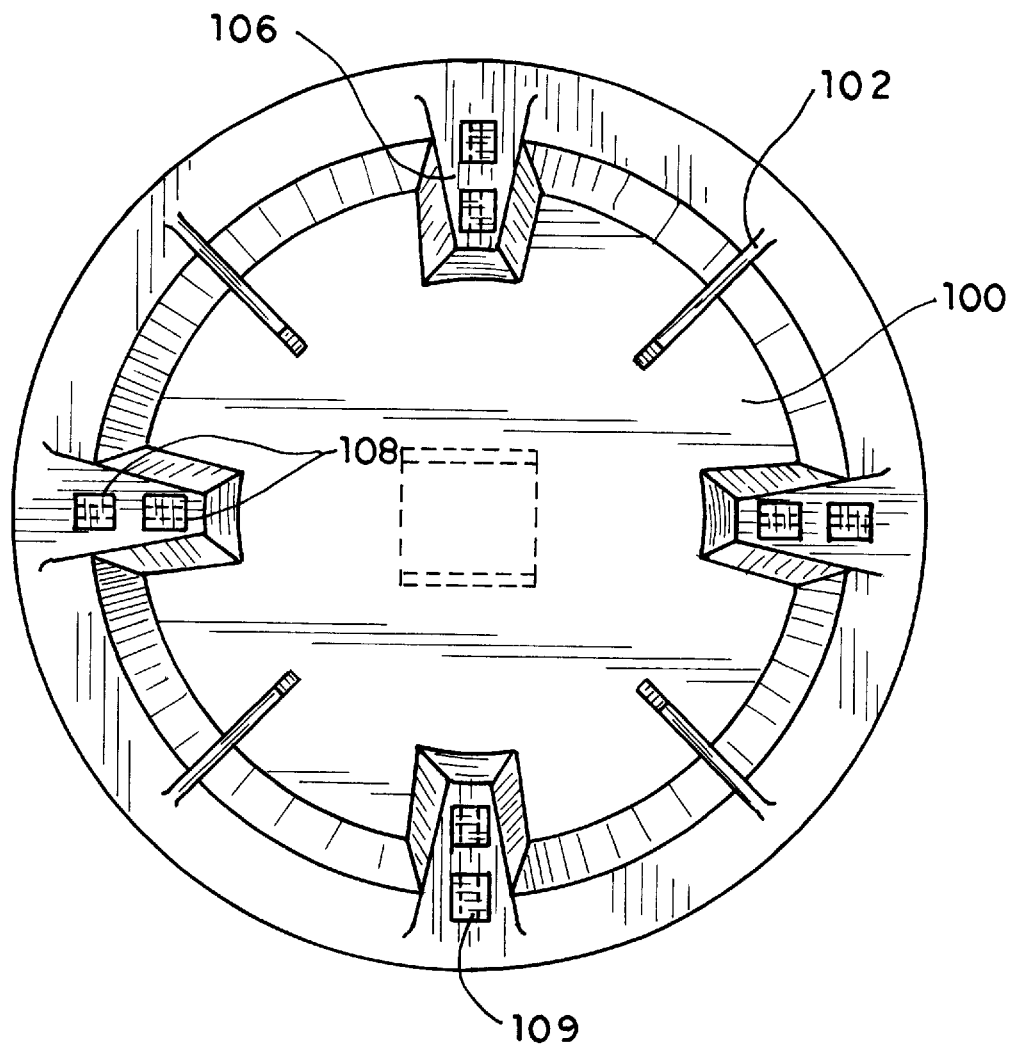
FIG. 7 is a top plan view of the feeder pan of the bird feeder assembly.

Structure to attach the feeder pan 100 to the container 10 is provided by a plurality of container abutments 106 and a plurality of long pins 110. The container abutments 106 (shown in FIG. 7) are formed integrally at regular intervals around the inner surface of the feeder pan 100 joining the sidewall thereof and the bottom thereof, extending radially inward from the sidewall to a point proximal to the sidewall of a container 10 placed within the feeder pan 100.

Pairs of pin receivers 108 are formed on the upper surfaces of each container abutment 106 in alignment with an axis extending radially from the center of the feeder pan 100. Each pin receiver 108 has a pin hole 109 formed therethrough which is aligned with the radial center of the feeder pan 100 and with the pin hole 109 formed in the other pin receiver 108 making up the pair. Each pin 110 is adapted to be inserted through the pin holes 109 in a pair of pin receivers 108 into the sidewall of the container 10 to thereby secure the feeder pan 100 on the bottom of a container 10.

The feeder pan 100 is reinforced by a plurality of pan stabilizers 102 (shown in FIG. 7) formed on the surface of the feeder pan 100 between the container abutments 106. The pan stabilizers 102 join the sidewall and the bottom of the feeder pan 100 extending radially inward from the sidewall to a point proximal to the sidewall of a container 10 placed therein. In order to support the feeder pan in a raised position above a flat surface, the pan stabilizers 102 also extend down through the feeder pan 100 along the bottom thereof to form a plurality of feet 104 thereon.

In this embodiment, two bracket assemblies 60 are provided, instead of a single bracket assembly 60. One bracket assembly 60 is used to support the roof structure 30 in the same fashion as described earlier, while the other bracket assembly 60 is attached to a vertical surface of pole below the first bracket assembly 60 to support the feeder pan 100 and the additional weight of the bird feed contained therein. In order to allow a bracket assembly 60 to be attached to the feeder pan 100, a bracket tip receiving slot 44 is formed on the bottom of the feeder pan 100 at the radial center thereof.

In each embodiment, the assembly will also include a plurality of metal screws 120, tie wraps 122, and screw anchors (not shown) as may be necessary to mount the feeder bracket 112 and the roof bracket base 62 on a vertical surface or a post.

It is to be understood that the present invention is not limited to the embodiments described above, but encompasses any and all embodiments within the scope of the following claims.

I claim:

1. An assembly for use in converting a container having a spout and a threaded cap closure into a bird house, said assembly comprising:
    a roof structure, dimensioned and configured to be attached to the container over the spout of the container, wherein said roof structure comprises:
        a skirt piece forming an upwardly tapering frustoconical shell, and having an inner surface, an outer surface, a top surface, and a bottom margin, said top surface having a spout hole formed in the radial center thereof, said spout hole having a diameter slightly larger than the outer diameter of the spout of the container, and slightly smaller than the outer diameter of the cap closure of the container, said bottom margin of said skirt piece being open and having a diameter large enough to receive the top of the container; and
        a crown piece forming a second, upwardly tapering frustoconical shell, and having a second inner surface, a second outer surface, a second top surface and a second bottom margin, said second bottom margin being open and having a diameter approximately equal to the outer diameter of said top of said skirt piece, said crown piece having a means to removably attach to said top of said skirt piece; whereby
        said skirt piece may be placed on the container so that the spout of the container protrudes through said spout hole in said top surface of said skirt piece, the cap closure of the container may be screwed onto the spout of the container, thereby securing said skirt piece to the container, and said crown piece may attached to said skirt piece to complete assembly of said roof structure;
    means defining an entrance hole cut into and through a sidewall of the container; and
    a perch and entrance ring assembly, dimensioned and configured to be secured within said entrance hole cut in the sidewall of the container, thus to provide a bird access to the interior of the container.

2. The assembly as defined in claim 1, further including:
    two small washers, each of said small washers having an outer diameter greater than said outer diameter of said spout hole and an inner diameter slightly larger than the diameter of a container having a spout with a narrow diameter such as a two liter soda bottle, said small washers being adapted to be placed around the spout of the container on opposite sides of said top surface of said skirt piece from each other so that said top surface of said skirt piece is clamped between said small washers when the container's cap is screwed onto the container's spout; and
    a large washer, said large washer having an outer diameter greater than said outer diameter of said spout hole and an inner diameter slightly larger than the diameter of a container having a spout with a medium diameter such as a plastic milk jug, said large washer being adapted to be placed around the spout of the container over said top surface of said skirt piece so that said top surface of said skirt piece is clamped between said large washer and the base of the container's spout when the container's cap is screwed onto the container's spout.

3. The assembly as defined in claim 1, wherein said means for attaching said crown piece to said skirt piece comprise a plurality of tabs formed on said bottom margin of said skirt piece, and extending downward therefrom, and a plurality of tab receivers formed in said skirt piece adjacent said top surface thereof in registry with said tabs, said tabs being adapted to flex inward when said crown piece is being lowered onto said skirt piece and then snap out into said tab receivers when said bottom margin of said crown piece contacts said top surface of said skirt piece.

4. The assembly as defined in claim 3, further including:
    two small washers, each of said small washers having an outer diameter greater than said outer diameter of said spout hole and an inner diameter slightly larger than the diameter of a container having a spout with a narrow diameter such as a two liter soda bottle, said small washers being adapted to be placed around the spout of the container on opposite sides of said top surface of said skirt piece from each other so that said top surface of said skirt piece is clamped between said small washers when the cap of the container is screwed onto the spout of the container; and
    a large washer, said large washer having an outer diameter greater than said outer diameter of said spout hole and an inner diameter slightly larger than the diameter of a container having a spout with a medium diameter such as a plastic milk jug, said large washer being adapted to be placed around the spout of the container over said top surface of said skirt piece so that said top surface of said skirt piece is clamped between said large washer and the base of the spout of the container when the cap of the container is screwed onto the spout of the container.

5. The assembly as defined in claim 1, further including a bracket assembly configured to be mounted on a pole or vertical surface to support said roof structure.

6. The assembly as defined in claim 5 wherein said bracket assembly comprises:
    a bracket base having a top edge, a bottom edge, two side edges, a front surface, and a rear surface, said rear surface defining a generally semicylindrical arc having a longitudinal axis extending from said top edge to said bottom edge of said bracket base, said bracket base being constructed of a flexible material so that the rear surface of said bracket base may flex to accommodate poles having various diameters, said bracket base having at least one screw hole formed therethrough adjacent each side edge of said bracket base, said bracket base having at least one groove formed in the front surface thereof;

a bracket arm adapted to be attached to said bracket base so that said bracket arm extends horizontally therefrom, said distal end of said bracket arm being adapted to have said roof structure attached thereto;

at least two screws adapted to be inserted through said screw holes; and at least one tie wrap adapted to be placed within said groove formed in said front surface of said bracket base; whereby said bracket base may be secured to a flat vertical surface using said screws, said bracket arm may be attached to said bracket base, and said roof structure may be attached to said distal end of said bracket arm to support a bird house constructed using the assembly of the present invention, and said bracket base may be placed on a pole so that the pole is partially encircled by said rear surface of said bracket base, said at least one tie wrap may be placed in said groove formed in said front surface of said bracket base and tied tightly around the pole to secure said bracket base to said pole, said bracket arm may be attached to said bracket base, and said roof structure may be attached to said distal end of said bracket arm to support a bird house constructed using the hereinbefore claimed assembly.

7. The assembly according to claim 6, wherein said rear surface of said bracket base has a textured pattern formed thereon, to increase friction between said rear surface of said bracket base and a pole on which said bracket base is mounted.

8. The assembly according to claim 6, wherein said bracket arm includes a short portion and a long portion joined together in L-fashion, and said bracket base includes a bracket arm receiving slot formed on the front surface of said bracket base, said bracket arm receiving slot having a vertically disposed longitudinal axis, said bracket arm receiving slot being adapted to have said short portion of said bracket arm inserted downwardly therethrough so that said bracket arm is supported on said bracket base and said long portion of said bracket arm extends horizontally from said front surface of said bracket base.

9. An assembly for use in converting a container having a spout and a threaded cap closure into a bird house, said assembly comprising:

a roof structure, dimensioned and configured to be attached to the container over the spout of the container;

means defining an entrance hole cut into and through a sidewall of the container; and a perch and entrance ring assembly, dimensioned and configured to be secured within said entrance hole cut in the sidewall of the container thus to provide a bird access to the interior of the container, wherein said perch and entrance ring assembly comprise:

an entrance ring having a front edge, a rear edge, and an outer diameter slightly smaller than the diameter of the entrance hole, said entrance ring having a plurality of notched tabs extending from said rearward edge thereof and a plurality of face portions extending radially from said front edge thereof, said face portions being adapted to engage the sidewall of the container around the entrance hole therein, said notched tabs being adapted to flex inwardly as said entrance ring is being inserted into the entrance hole, and to snap outwardly to engage the edge of the entrance hole when said face portions of said entrance ring contact the sidewall of the container; and a perch joined to said entrance ring by a connection member adapted to support said perch in front of said entrance ring in a horizontal position parallel to the sidewall of the container, said connection member having a pin formed thereon which is configured to be inserted through the sidewall of the container to further secure said perch and entrance ring assembly within the sidewall of the container.

10. An assembly for use in converting a container having a spout and a threaded cap closure into a bird feeder, said assembly comprising:

a roof structure dimensioned and configured to be attached to the container over the spout and threaded cap closure of the container, wherein said roof structure comprises:

a skirt piece forming an upwardly tapering frustoconical shell, and having an inner surface, an outer surface, a top surface, and a bottom margin, said top surface having a spout hole formed in the radial center thereof, said spout hole having a diameter slightly larger than the outer diameter of the spout of the container, and slightly smaller than the outer diameter of the cap closure of the container, said bottom margin of said skirt piece being open and having a diameter large enough to receive the top of the container; and a crown piece forming a second, upwardly tapering frustoconical shell, and having a second inner surface, a second outer surface, a second top surface and a second bottom margin, said second bottom margin being open and having a diameter approximately equal to the outer diameter of said top of said skirt piece, said crown piece having a means to removably attach to said top of said skirt piece; whereby said skirt piece may be placed on the container so that the spout of the container protrudes through said spout hole in said top surface of said skirt piece, the cap closure of the container may be screwed onto the spout of the container, thereby securing said skirt piece to the container, and said crown piece may attached to said skirt piece to complete assembly of said roof structure;

means defining a plurality of feed holes through the sidewall of the container adjacent the bottom thereof; and a feeder pan, there further being means for attaching said pan to the bottom of the container to support significant quantities of bird feed which spill from the said plurality of feed holes cut in the sidewall of the container adjacent the bottom thereof.

11. The assembly as defined in claim 10, further including:

two small washers, each of said small washers having an outer diameter greater than said outer diameter of said spout hole and an inner diameter slightly larger than the diameter of a container having a spout with a narrow diameter such as a two liter soda bottle, said small washers being adapted to be placed around the spout of the container on opposite sides of said top surface of said skirt piece from each other so that said top surface of said skirt piece is clamped between said small washers when the container's cap is screwed onto the container's spout; and a large washer, said large washer having an outer diameter greater than said outer diameter of said spout hole and an inner diameter slightly larger than the diameter of a container having a spout with a medium diameter such as a plastic milk jug, said large washer being adapted to be placed around the spout of the container over said top surface of said skirt piece so that said top surface of said skirt piece is clamped between said large washer and the base of the container's spout when the container's cap is screwed onto the container's spout.

12. The assembly as defined in claim 10, wherein said means for attaching said crown piece to said skirt piece comprise a plurality of tabs formed on said bottom margin of said skirt piece extending downward therefrom and a plurality of tab receivers formed in said skirt piece adjacent said top surface thereof in registry with said tabs, said tabs being adapted to flex inward when said crown piece is being lowered onto said skirt piece and then snap out into said tab receivers when said bottom margin of said crown piece contacts said top surface of said skirt piece.

13. The assembly as defined in claim 12, further including:

two small washers, each of said small washers having an outer diameter greater than said outer diameter of said spout hole and an inner diameter slightly larger than the diameter of a container having a spout with a narrow diameter such as a two liter soda bottle, said small washers being adapted to be placed around the spout of the container on opposite sides of said top surface of said skirt piece from each other so that said top surface of said skirt piece is clamped between said small washers when the cap of the container is screwed onto the spout of the container; and a large washer, said large washer having an outer diameter greater than said outer diameter of said spout hole and an inner diameter slightly larger than the diameter of a container having a spout with a medium diameter such as a plastic milk jug, said large washer being adapted to be placed around the spout of the container over said top surface of said skirt piece so that said top surface of said skirt piece is clamped between said large washer and the base of the spout of the container when the cap of the container is screwed onto the spout of the container.

14. The assembly as defined in claim 10, further including two bracket assemblies configured to be mounted on a pole or vertical surface, one to support said roof structure, and the other to support the base of the container.

15. An assembly for use in converting a container having a spout and a threaded cap closure into a bird feeder, said assembly comprising:

a roof structure dimensioned and configured to be attached to the container over the spout and threaded cap closure of the container;

means defining a plurality of feed holes through the sidewall of the container adjacent, the bottom thereof;

a feeder pan formed as a downwardly tapering frusto-conical shell having an inner surface, an outer surface, a top margin and a bottom surface, said top margin of said feeder pan being open and having a diameter large enough to receive the bottom of the container, said bottom surface being closed so that it may support the bottom of the container and catch the bird feed that spills out of the said feed holes in the container; and means for attaching said pan to the bottom of the container to support significant quantities of bird feed which spill from the said plurality of feed holes cut in the sidewall of the container adjacent the bottom thereof, wherein said means for attaching said feeder pan to said container comprise:

a plurality of container abutments formed on said inner surface of said feeder pan at generally equispaced intervals around said sidewall of said feeder pan adjacent said top margin thereof, said container abutments extending radially inward from said sidewall of said feeder pan to a point proximal to the sidewall of a container placed in said feeder pan;

a pair of pin receivers formed on each of said container abutments, each of said pin receivers in each pair thereof having a pin hole formed therethrough aligned with the radial center of said feeder pan; and a plurality of pins adapted to be inserted through said pin holes formed through said pairs of pin receivers into the wall of the container to which said feeder pan is being attached, to secure said feeder pan thereon.

16. The assembly as defined in claim 15, further including a plurality of pan stabilizers formed integrally on said feeder pan in between said container abutments, said pan stabilizers acting to join said bottom member and said sidewall of said feeder pan to reinforce said feeder pan, said pan stabilizers extending through said bottom member of said feeder pan to form a plurality of feet on the outer surface thereof, adapted to support the said bird feeder above a flat surface.

* * * * *